UNITED STATES PATENT OFFICE.

GEORGE W. DAVIS, OF BOSTON, MASSACHUSETTS, ASSIGNOR OF ONE-HALF HIS RIGHT TO CHARLES W. LEWIS, OF SAME PLACE.

IMPROVEMENT IN INSECT-DESTROYING COMPOUNDS.

Specification forming part of Letters Patent No. 166,917, dated August 24, 1875; application filed July 13, 1875.

*To all whom it may concern:*

Be it known that I, GEORGE W. DAVIS, of Boston, in the county of Suffolk and State of Massachusetts, have invented a certain new and useful Compound for Destroying Insects, of which the following is a specification:

The nature of my invention consists in the admixture of carbonates of lime and magnesia with iron pyrites and with an alkali. This, when applied to plants, is fatal to and will destroy insects.

My compound consists of crude potash, dolomite, or magnesian limestone, a double carbonate of lime and magnesia, carrying about seventy-five per cent. of these carbonates and iron pyrites.

I take dolomite to the amount of nearly eighteen hundred pounds, iron pyrites about one hundred and fifty pounds, and of crude potash, carrying about seventy-five per cent. of alkali or pure potash, one hundred pounds, making a total of two thousand and fifty pounds. Loss in pulverizing, say, fifty pounds, leaving two thousand pounds.

To prepare my compound the dolomite and iron pyrites are reduced to a fine powder by any suitable method. The crude potash is then dissolved in a sufficient quantity of water, so that on adding the pulverized dolomite the whole mass will assume the consistency of mortar when in condition to work. This mixture is then partially calcined in an oven or on a drying-furnace until it has become as hard as chalk, after which it is reduced to an impalpable powder by any suitable means.

This powder is applied about the roots and to foliage of plants, vines, fruit trees, and shrubs infected by noxious insects, in greater or less quantities, as the occasion demands.

By this application the insects and their eggs on the plant, to which the composition has been applied, are destroyed, and other insects are prevented from attacking it. The powder also has some invigorating properties on account of its potash, and does not injure but rather assists the growth of the plant to which it is applied.

I claim as my invention—

The composition of matter, consisting of carbonates of lime and magnesia, crude potash and iron pyrites, substantially as described, and for the purpose set forth.

GEORGE W. DAVIS.

Witnesses:
 FRANK G. PARKER,
 GEORGE D. BANCROFT.